(12) United States Patent
Mullins et al.

(10) Patent No.: US 9,844,119 B2
(45) Date of Patent: Dec. 12, 2017

(54) DYNAMIC LIGHTING FOR HEAD MOUNTED DEVICE

(71) Applicant: DAQRI, LLC, Los Angeles, CA (US)

(72) Inventors: Brian Mullins, Sierra Madre, CA (US); Matthew Kammerait, West Hollywood, CA (US)

(73) Assignee: DAQRI, LLC, Los Angeles, CA (US)

( * ) Notice: Subject to any disclaimer, the term of this patent is extended or adjusted under 35 U.S.C. 154(b) by 12 days.

(21) Appl. No.: 15/019,031

(22) Filed: Feb. 9, 2016

(65) Prior Publication Data
US 2016/0231573 A1 Aug. 11, 2016

Related U.S. Application Data (60) Provisional application No. 62/114,195, filed on Feb. 10, 2015.

(51) Int. Cl.
G09G 5/00 (2006.01)
H05B 37/02 (2006.01)
H05B 33/08 (2006.01)
G02B 27/01 (2006.01)

(52) U.S. Cl.
CPC ....... *H05B 37/0218* (2013.01); *G02B 27/017* (2013.01); *H05B 33/0869* (2013.01); *H05B 33/0872* (2013.01); *G02B 2027/014* (2013.01); *G02B 2027/0118* (2013.01); *G02B 2027/0138* (2013.01); *G02B 2027/0187* (2013.01); *Y02B 20/46* (2013.01)

(58) Field of Classification Search
CPC .. G02B 27/0093; G02B 27/01; G02B 27/017; G02B 2027/0118; G02B 2027/0138; G02B 2027/014; G06F 1/163; G06F 3/005; G06F 3/011; G06F 3/013; G06T 19/006; A61B 3/112; H05B 37/02; H05B 37/0218
See application file for complete search history.

(56) References Cited

U.S. PATENT DOCUMENTS

| | | | |
|---|---|---|---|
| 6,847,336 B1 * | 1/2005 | Lemelson | A61B 1/00048 345/8 |
| 7,401,920 B1 | 7/2008 | Kranz et al. | |
| 7,744,216 B1 * | 6/2010 | Uhlhorn | G09G 5/00 351/204 |

(Continued)

OTHER PUBLICATIONS

"International Application Serial No. PCT/US2016/017133, International Search Report dated May 2, 2016", 3 pgs.

(Continued)

*Primary Examiner* — Joe H Cheng
(74) *Attorney, Agent, or Firm* — Schwegman Lundberg & Woessner, P.A.

(57) ABSTRACT

A head mounted device includes a helmet, an ambient light sensor, a pupil dimension sensor, a lighting element, and a dynamic lighting system. The ambient light sensor is disposed in an outside surface of the helmet and measures ambient light outside the helmet. The pupil dimension sensor is disposed in a housing of the helmet and measures a size of a pupil of a wearer of the helmet. The lighting element is disposed in the outside surface of the helmet. The dynamic lighting system controls the lighting element and adjusts an intensity of the lighting element based on the ambient light and the pupil size of the wearer of the helmet.

20 Claims, 9 Drawing Sheets

(56) References Cited

U.S. PATENT DOCUMENTS

| | | | |
|---|---|---|---|
| 8,824,779 B1* | 9/2014 | Smyth | G06K 9/0061 |
| | | | 382/100 |
| 9,412,205 B2* | 8/2016 | Mullins | G06T 19/006 |
| 9,558,592 B2* | 1/2017 | Mullins | G06T 19/006 |
| 9,619,712 B2* | 4/2017 | Mullins | G06K 9/00671 |
| 2003/0210228 A1* | 11/2003 | Ebersole | G02B 27/017 |
| | | | 345/157 |
| 2013/0066213 A1 | 3/2013 | Wellington | |
| 2013/0114043 A1* | 5/2013 | Balan | H04N 13/044 |
| | | | 351/210 |
| 2013/0127980 A1* | 5/2013 | Haddick | G06F 3/013 |
| | | | 348/14.08 |
| 2013/0278631 A1 | 10/2013 | Border et al. | |
| 2013/0335301 A1* | 12/2013 | Wong | G02B 27/0093 |
| | | | 345/8 |
| 2014/0002444 A1* | 1/2014 | Bennett | G06F 3/012 |
| | | | 345/419 |
| 2015/0058319 A1* | 2/2015 | Miyajima | G06F 17/30867 |
| | | | 707/722 |
| 2015/0062323 A1* | 3/2015 | Gustafsson | G06F 3/013 |
| | | | 348/78 |
| 2015/0088546 A1* | 3/2015 | Balram | G06F 19/322 |
| | | | 705/3 |
| 2015/0187138 A1* | 7/2015 | Mullins | G06K 9/00671 |
| | | | 345/633 |
| 2015/0319826 A1* | 11/2015 | Ahn | H05B 37/0272 |
| | | | 315/152 |
| 2016/0341961 A1* | 11/2016 | Mullins | G06F 1/163 |
| 2016/0342782 A1* | 11/2016 | Mullins | G02B 27/0176 |

OTHER PUBLICATIONS

"International Application Serial No. PCT/US2016/017133, Written Opinion dated May 2, 2016", 7 pgs.

\* cited by examiner

DYNAMIC LIGHTING FOR HEAD MOUNTED DEVICE

REFERENCE TO RELATED APPLICATION

This application claims the benefit of priority of U.S. Provisional Application No. 62/114,195 filed Feb. 10, 2015, which is hereby incorporated by reference in its entirety.

TECHNICAL FIELD

The subject matter disclosed herein generally relates to a head mounted device. Specifically, the present disclosure addresses systems and methods for a dynamic lighting system in a helmet.

BACKGROUND

An augmented reality (AR) device can be used to generate and display data in addition to an image captured with the AR device. For example, AR is a live, direct, or indirect view of a physical, real-world environment whose elements are augmented by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

When the user enters a dim environment that requires lighting, the user typically has to manually turn on a handheld flashlight. In other situations, the user is looking at an area (e.g., inside a car engine) that requires additional lighting.

BRIEF DESCRIPTION OF THE DRAWINGS

Some embodiments are illustrated by way of example and not limitation in the figures of the accompanying drawings.

DETAILED DESCRIPTION

Example methods and systems are directed to a dynamic lighting system of a head mounted device (HMD). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, a head mounted device includes a helmet that includes lighting elements (e.g., LEDs) disposed in a front portion of the helmet to project lights. The brightness of the projecting lights is automatically adjusted based on the size of the pupil of the wearer of the helmet. The helmet includes an ambient light sensor, a pupil dimension sensor, a lighting element, and a dynamic lighting system. The ambient light sensor is disposed in an outside surface of the helmet and measures ambient light outside the helmet. The pupil dimension sensor is disposed in a housing of the helmet and measures a size of a pupil of a wearer of the helmet. The lighting element is disposed in the outside surface of the helmet. The dynamic lighting system controls the lighting element and adjusts an intensity of the lighting element based on the ambient light and the pupil size of the wearer of the helmet.

The pupil dimension sensor includes an infrared camera pointed towards an eye of the wearer of the helmet to capture an image of the pupil of the wearer. The infrared camera allows for a measurement of the size of the pupil based on the captured image of the pupil.

The dynamic lighting system increases an intensity of the lighting element in response to the pupil size exceeding a pupil size threshold, and also decreases an intensity of the lighting element in response to the pupil size falling below a pupil size threshold. In another example, the dynamic lighting system adjusts the intensity of the lighting element to maintain the size of the pupil within a predefined pupil size range.

An eye gaze sensor determines a position of the pupil relative to the eye of the wearer of the helmet. The dynamic lighting system then adjusts a position of the lighting element to direct an output of the lighting element in a direction corresponding to the position of the pupil.

The head mounted device further includes a camera embedded in the outside surface of the helmet, a hardware processor, and a transparent display lens. The hardware processor includes an augmented reality application configured to generate augmented reality content based images captured with the camera. The transparent display lens is mounted to a frame connected to the housing of the helmet. The transparent display lens displays the augmented reality content. In another example, the pupil dimension sensor is embedded in the transparent display lens. The dynamic lighting system adjusts a brightness of the augmented reality content in the transparent display lens in conjunction with the intensity of the lighting element based on the pupil size of the wearer of the helmet.

In another example embodiment, the augmented reality application identifies an object in an image captured with the camera, retrieves a three-dimensional model of a virtual object from the augmented reality content based on the identified object, and renders the three-dimensional model of the virtual object in the transparent display lens. The virtual object is perceived as an overlay on the object.

In one example embodiment, the HMD includes a helmet with a display surface that can be retracted inside the helmet and extended outside the helmet to allow a user to view the display surface. The position of the display surface may be adjusted based on an eye level of the user. The display surface includes a display lens capable of displaying augmented reality (AR) content. The helmet may include a computing device such as a hardware processor with an AR application that allows the user wearing the helmet to experience information, such as in the form of a virtual object such as a three-dimensional (3D) virtual object overlaid on an image or a view of a physical object (e.g., a gauge) captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the helmet. The display lens may be transparent to allow the user see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet or other inputs from other devices, such as a wearable device. For example, the display lenses may extract or retract based on a voice command of the user, a gesture of the user, a position of a watch in communication with the helmet.

In another example embodiment, a non-transitory machine-readable storage device may store a set of instructions that, when executed by at least one processor, causes the at least one processor to perform the method operations discussed within the present disclosure.

Figure 1:
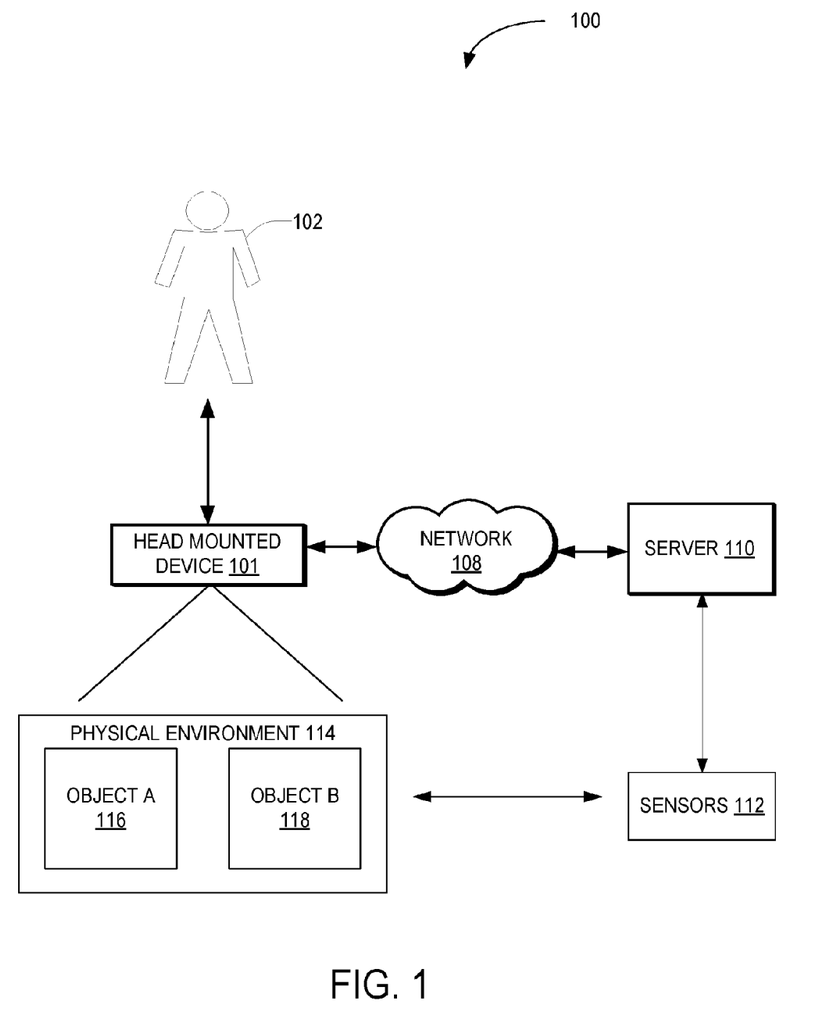
FIG. 1 is a block diagram illustrating an example of a network suitable for a head mounted device system, according to some example embodiments.

FIG. 1 is a network diagram illustrating a network environment 100 suitable for operating an AR application of a HMD with retractable display lenses, according to some example embodiments. The network environment 100 includes a HMD 101 and a server 110, communicatively coupled to each other via a network 108. The HMD 101 and the server 110 may each be implemented in a computer system, in whole or in part, as described below with respect to FIG. 10.

The server 110 may be part of a network-based system. For example, the network-based system may be or include a cloud-based server system that provides AR content (e.g., augmented information including 3D models of virtual objects related to physical objects captured by the HMD 101) to the HMD 101.

The HMD 101 may include a helmet that a user 102 may wear to view the AR content related to captured images of several physical objects (e.g., object A 116, object B 118) in a real world physical environment 114. In one example embodiment, the HMD 101 includes a computing device with a camera and a display (e.g., smart glasses, smart helmet, smart visor, smart face shield, smart contact lenses). The computing device may be removably mounted to the head of the user 102. In one example, the display may be a screen that displays what is captured with a camera of the HMD 101. In another example, the display of the HMD 101 may be a transparent or semi-transparent surface, such as in the visor or face shield of a helmet, or a display lens distinct from the visor or face shield of the helmet.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, and letters. The user 102 may point a camera of the HMD 101 to capture an image of the objects 116 and 118 in the physical environment 114.

In one example embodiment, the objects 116, 118 in the image are tracked and recognized locally in the HMD 101 using a local context recognition dataset or any other previously stored dataset of the AR application of the HMD 101. The local context recognition dataset module may include a library of virtual objects associated with real-world physical objects 116, 118 or references. In one example, the HMD 101 identifies feature points in an image of the devices 116, 118 to determine different planes (e.g., edges, corners, surface, dial, letters). The HMD 101 may also identify tracking data related to the devices 116, 118 (e.g., GPS location of the HMD 101, orientation, distances to devices 116, 118). If the captured image is not recognized locally at the HMD 101, the HMD 101 can download additional information (e.g., 3D model or other augmented data) corresponding to the captured image, from a database of the server 110 over the network 108.

In another embodiment, the objects 116, 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects 116, 118 or references.

Sensors 112 may be associated with, coupled to, or related to the devices 116 and 118 in the physical environment 114 to measure a location, information, or measured readings of the devices 116 and 118. Examples of measured readings may include and but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the devices 116 and 118 to show data related to the devices 116 and 118. For example, the virtual indicators may include arrows with shapes and colors that change based on real-time data. The visualization may be provided to the HMD 101 so that the HMD 101 can render the virtual indicators in a display of the HMD 101. In another embodiment, the virtual indicators are rendered at the server 110 and streamed to the HMD 101. The HMD 101 displays the virtual indicators or visualization corresponding to a display of the physical environment 114 (e.g., data is visually perceived as displayed adjacent to the devices 116 and 118).

The sensors 112 may include other sensors used to track the location, movement, and orientation of the HMD 101 externally without having to rely on the sensors 112 internal to the HMD 101. The sensors 112 may include optical sensors (e.g., depth-enabled 3D camera), wireless sensors (Bluetooth, Wi-Fi), GPS sensor, and audio sensors to determine the location of the user 102 having the HMD 101, distance of the user 102 to the tracking sensors 112 in the physical environment 114 (e.g., sensors 112 placed in corners of a venue or a room), the orientation of the HMD 101 to track what the user 102 is looking at (e.g., direction at which the HMD 101 is pointed, HMD 101 pointed towards a player on a tennis court, HMD 101 pointed at a person in a room).

In another embodiment, data from the sensors 112 and internal sensors in the HMD 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., such as whether a user 102 tapped on a link in the virtual object), and any suitable combination thereof. The HMD 101 receives a visualization content dataset related to the analytics data. The HMD 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMD 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
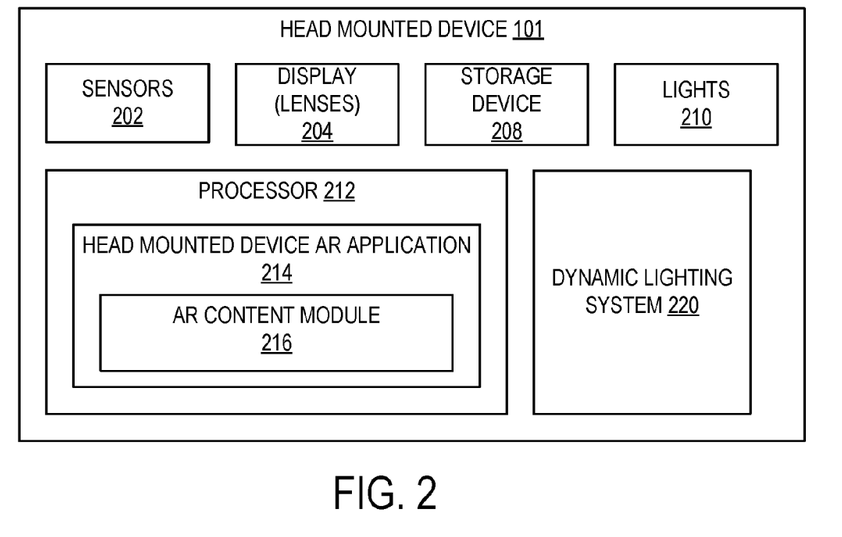
FIG. 2 is a block diagram illustrating an example embodiment of a head mounted device.

FIG. 2 is a block diagram illustrating modules (e.g., components) of the HMD 101, according to some example embodiments. The HMD 101 may be a helmet that includes sensors 202, a display 204, a storage device 208, lighting elements 210, a processor 212, and a dynamic lighting system 220.

The sensors 202 may include, for example, a proximity or location sensor (e.g., near field communication, GPS, Bluetooth, Wi-Fi), an optical sensor(s) (e.g., camera), an orientation sensor(s) (e.g., gyroscope, or an inertial motion sensor), an audio sensor (e.g., a microphone), or any suitable combination thereof. For example, the sensors 202 may include rear facing camera(s) and front facing camera(s) disposed in the HMD 101. It is noted that the sensors 202 described herein are for illustration purposes. Sensors 202 are thus not limited to the ones described. The sensors 202 may be used to generate internal tracking data of the HMD 101 to determine what the HMD 101 is capturing or looking at in the real physical world. For example, a virtual menu may be activated when the sensors 202 indicate that the HMD 101 is oriented in a particular direction (e.g., when the user 102 tilts his head to watch his wrist).

Figure 3:
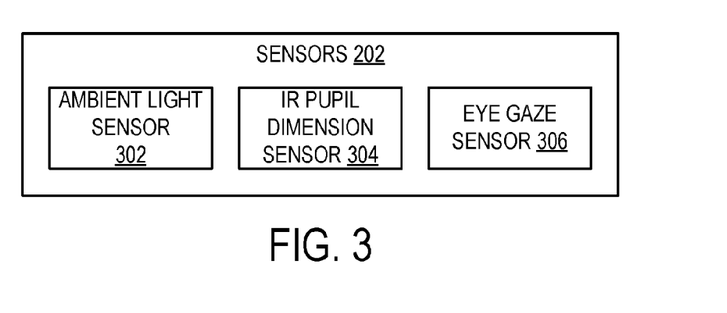
FIG. 3 is a block diagram illustrating an example embodiment of sensors.

FIG. 3 illustrates example embodiments of sensors 202. For example, the sensors 202 include an ambient light sensor 302, an IR pupil dimension sensor 304, and an eye gaze sensor 306. The ambient light sensor 302 is configured to determine an ambient luminosity. For example, the ambient light sensor 302 measures the ambient light in a room. The IR pupil dimension sensor 304 may include an infrared sensor pointed at an eye of the user 102 to measure the size of the pupil of the user 102. The IR pupil dimension sensor 304 may sample the size of the pupil on a periodic basis or based on predefined triggered events (e.g., user 102 walks into a different room, sudden changes in the ambient light). The eye gaze sensor 306 may determine a position of the pupil relative to an eye of the user 102 (e.g., the wearer of the helmet).

Referring back to FIG. 2, the display 204 may include a display surface or lens capable of displaying AR content (e.g., images, video) generated by the processor 212. In another embodiment, the display 204 may also include a touchscreen display configured to receive a user input via a contact on the touchscreen display. In another example, the display 204 may be transparent or semi-transparent so that the user 102 can see through the display lens 204 (e.g., such as in a head-up display).

The storage device 208 may store a database of identifiers of wearable devices capable of communicating with the HMD 101. In another embodiment, the database may also include visual references (e.g., images) and corresponding experiences (e.g., 3D virtual objects, interactive features of the 3D virtual objects). The database may include a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding experiences (e.g., virtual objects that represent the ten most sensing devices in a factory floor). In another example, the server 110 may generate the first set of images based on the most popular or often scanned images received at the server 110. Thus, the primary content dataset does not depend on objects 116, 118 or images scanned by the HMD 101.

The contextual content dataset includes, for example, a second set of images and corresponding experiences (e.g., three-dimensional virtual object models) retrieved from the server 110. For example, images captured with the HMD 101 that are not recognized (e.g., by the server 110) in the primary content dataset are submitted to the server 110 for recognition. If the captured image is recognized by the server 110, a corresponding experience may be downloaded at the HMD 101 and stored in the contextual content dataset. Thus, the contextual content dataset relies on the contexts in which the HMD 101 has been used. As such, the contextual content dataset depends on objects or images scanned by the HMD AR application 214 of the HMD 101.

In one embodiment, the HMD 101 may communicate over the network 108 with the server 110 to retrieve a portion of a database of visual references, corresponding 3D virtual objects, and corresponding interactive features of the 3D virtual objects.

The lights 210 may include LED lights. An intensity and color of the LED lights may be controlled and adjusted by the dynamic lighting system 220. As such, the lights 210 can be turned on or off and are dimmable. The color of the LED lights may change based on predefined conditions. For example, when the user 102 walks outside a facility under a night sky, the lights 210 generate red light to minimize glare.

The processor 212 may include HMD AR application 214 for generating a display of information related to the objects 116, 118. In one example embodiment, the HMD AR application 214 includes an AR content module 216. The AR content module 216 generates a visualization of information related to the objects 116, 118 when the HMD 101 captures an image of the objects 116, 118 and recognizes the objects 116, 118 or when the HMD 101 is in proximity to the objects 116, 118. For example, the HMD AR application 214 may generate a display of a holographic or virtual menu visually perceived as a layer on the objects 116, 118. The display controller 218 is configured to control the display 204. For example, the display controller 218 controls an adjustable position of the display 204 in the HMD 101 and controls a power supplied to the display 204.

Figure 4:
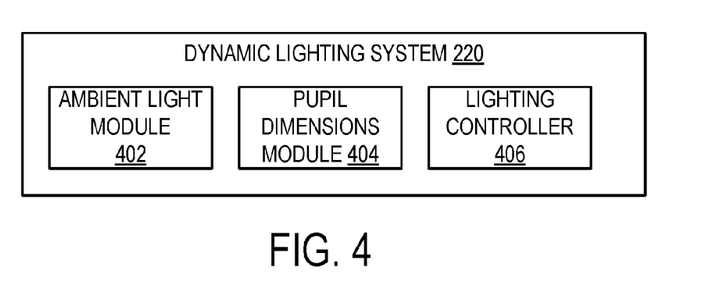
FIG. 4 is a block diagram illustrating an example embodiment of a dynamic lighting system.

In one example embodiment, the dynamic lighting system 220 includes an ambient light module 402, a pupil dimensions module 404, and a lighting controller 406 as illustrated in FIG. 4. The ambient light module 402 communicates with ambient light sensor 302 in the HMD 101 to identify and measure ambient light around the HMD 101. For example, the ambient light sensor 302 measures a light intensity of the ambient environment to the HMD 101. The pupil dimension module 404 communicates with the infrared (IR) pupil dimension sensor 304 to measure a size of the pupil.

The lighting controller 406 controls and adjusts a color and an output of the lights 210 based on the measured ambient light and the pupil dimensions of the user 102. For example, the intensity of the lights 210 may be increased if the pupil size is below a lower predefined size threshold. The intensity of the lights 210 may be adjusted incrementally until the pupil size falls within a preset range. In another example, the intensity of the lights 210 may be decreased if the pupil size is above an upper predefined size threshold.

In another example, the lighting controller 406 may receive a user preference for dim or bright lighting. As such, the lighting controller 406 generates a user preference comprising a custom preset range for the pupil size. Furthermore, the lighting controller 406 calibrates the range of the pupil size for each user 102 by measuring ambient light and correlating with pupil size at ambient light.

The lighting controller 406 may control the color of the LED based on predefined conditions. For example, if the AR application 214 detects an imminent danger, the LED may flash red. The imminent danger may be determined based on input from the sensors 202. The color and intensity of the lights 210 may be based on the pupil size and activities of user 102 of the head mounted device 101. Other biometrics measurement may be used in computing and adjusting the intensity of the lights 210.

Any one or more of the modules described herein may be implemented using hardware (e.g., a processor 212 of a machine) or a combination of hardware and software. For example, any module described herein may configure a processor 212 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
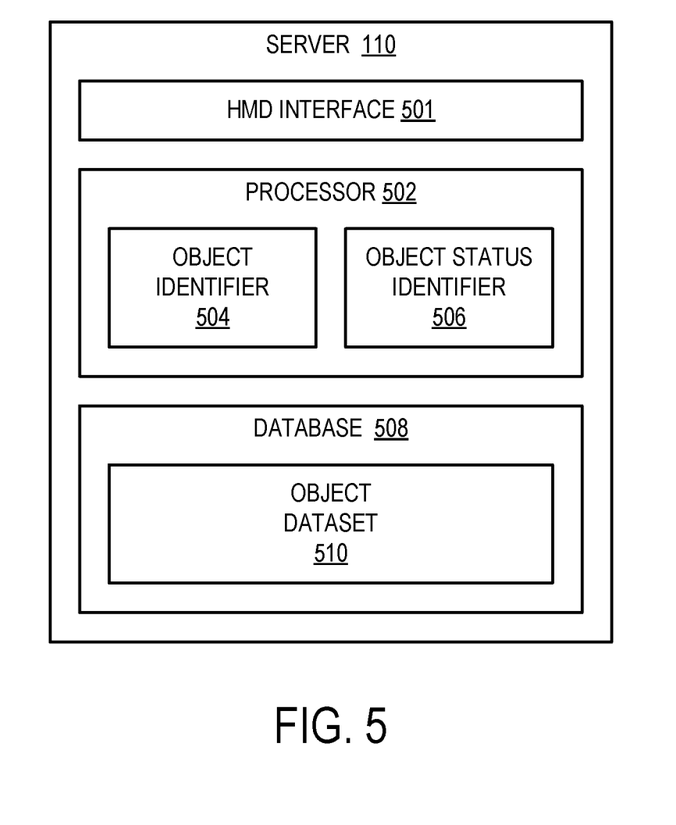
FIG. 5 is a block diagram illustrating an example embodiment of a server.

FIG. 5 is a block diagram illustrating modules (e.g., components) of the server 110. The server 110 includes an HMD interface 501, a processor 502, and a database 508. The HMD interface 501 may communicate with the HMD 101, the head mounted device 101, and sensors 112 (FIG. 1) to receive real time data.

The processor 502 may include an object identifier 504 and an object status identifier 506. The object identifier 504 may identify devices 116, 118 based on a picture or image frame received from the HMD 101. In another example, the HMD 101 has already identified devices 116, 118 and has provided the identification information to the object identifier 504. The object status identifier 506 determines the physical characteristics associated with the devices identified. For example, if the device is a gauge, the physical characteristics may include functions associated with the gauge, location of the gauge, reading of the gauge, other devices connected to the gauge, safety thresholds or parameters for the gauge. AR content may be generated based on the object identified and a status of the object.

The database 508 may store an object dataset 510. The object dataset 510 may include a primary content dataset and a contextual content dataset. The primary content dataset comprises a first set of images and corresponding virtual object models. The contextual content dataset may include a second set of images and corresponding virtual object models.

Figure 6:
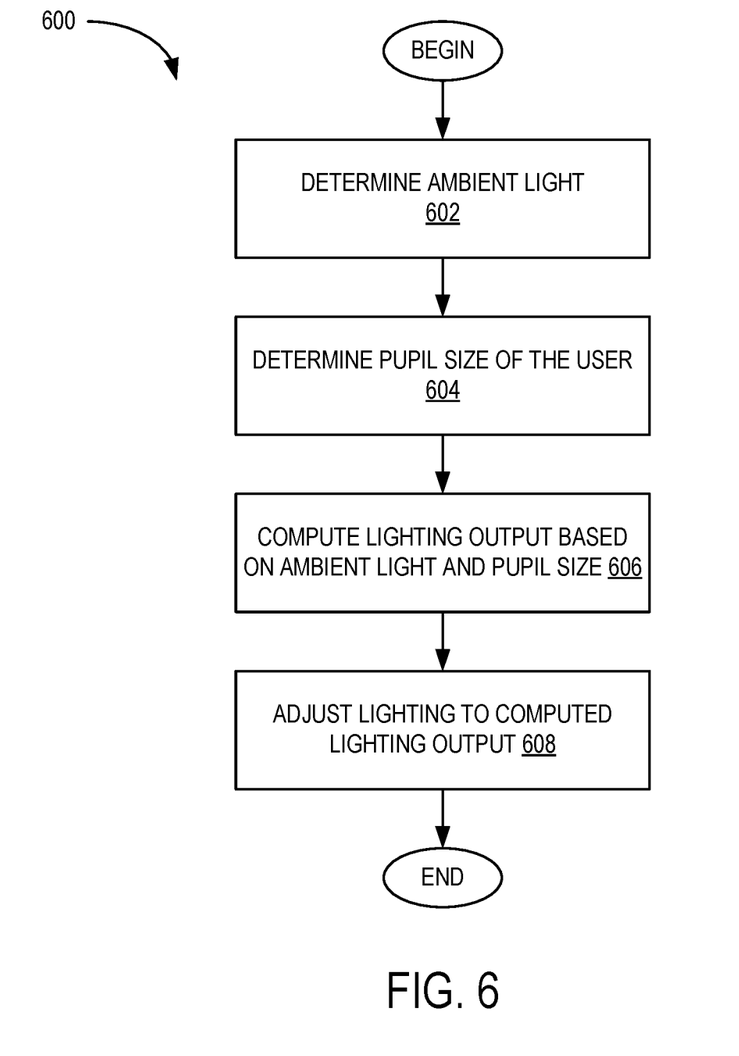
FIG. 6 is a flowchart illustrating a method for operating a dynamic lighting system of a head mounted device, according to an example embodiment.

FIG. 6 is a flowchart illustrating an example method 600 for operating the lights 210. At operation 602, the HMD 101 determines an intensity of the ambient light around the HMD 101. In one example, cameras in the HMD 101 may be used to determine the intensity of the ambient light. In one example embodiment, operation 602 may be implemented using the ambient light sensor 302 in connection with the ambient light module 402 of FIG. 4.

At operation 604, the HMD 101 determines a size of the pupil of the wearer of the HMD 101. In one example embodiment, operation 604 may be implemented using the pupil dimension sensor 304 of FIG. 3 and the pupil dimension module 404 of FIG. 4.

At operation 606, the HMD 101 computes the lighting output or intensity based on the measurements of ambient light and pupil size. For example, the lighting output may be increased in a dark environment. In one embodiment, operation 608 may be implemented using the lighting controller 406 of FIG. 4. At operation 608, the lighting controller 406 further controls the intensity of the lights 210 based on the previously computed lighting output.

Figure 7:
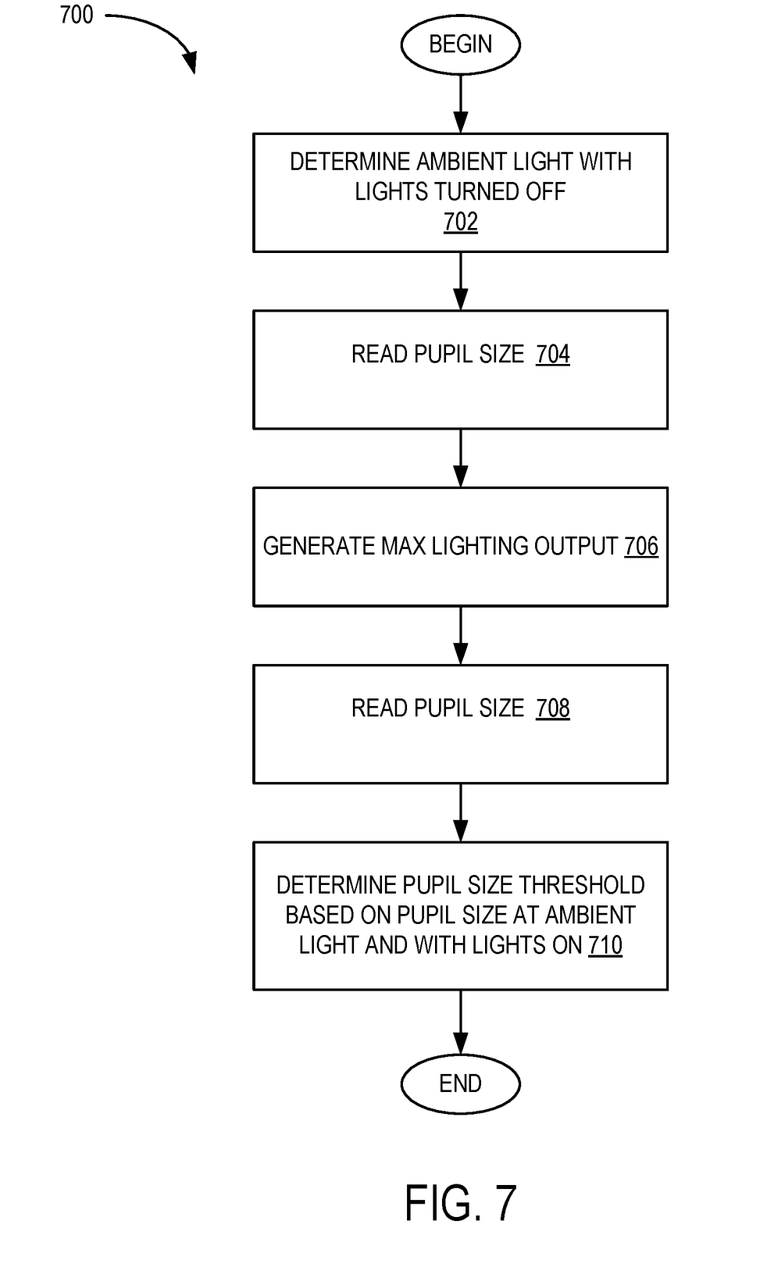
FIG. 7 is a flowchart illustrating a method for calibrating a dynamic lighting system of a head mounted device, according to an example embodiment.

FIG. 7 is a flowchart illustrating a method 700 for calibrating a dynamic lighting system 220 of a head mounted device 101, according to an example embodiment. At operation 702, the HMD 101 powers down the lights 210 and determines the ambient. At operation 704, the HMD 101 determines the pupil size of the wearer of the HMD 101 in ambient light conditions. At operation 706, the HMD 101 generates a maximum lighting output. At operation 708, the HMD 101 determines the pupil size of the wearer the lights 210 at their maximum output. At operation 710, the HMD 101 determines a pupil size threshold based on pupil size at ambient with no lights 210 on and pupil size at ambient light with lights 210 on.

Figure 8:
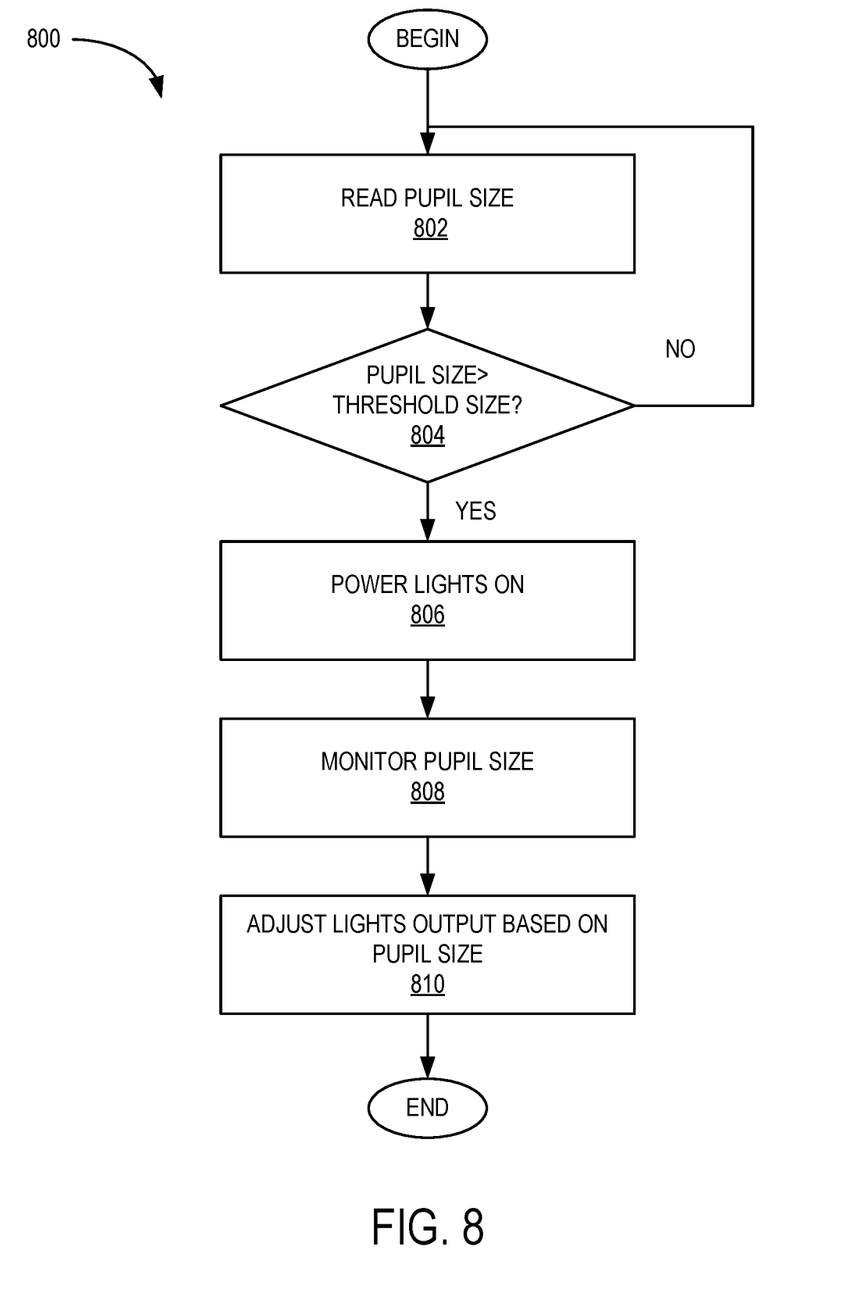
FIG. 8 is a flowchart illustrating a method for adjusting light output of a head mounted device, according to an example embodiment.

FIG. 8 is a flowchart illustrating a method 800 for adjusting light output of a head mounted device 101, according to an example embodiment. At operation 802, the HMD 101 determines the pupil size of the user 102 of the HMD 101. At operation 804, the HMD 101 compares the pupil size with a threshold pupil size for the user 102. At operation 806, the HMD 101 powers the lights 210 on in response to the pupil size exceeding the threshold pupil size. At operation 808, the HMD 101 monitors the pupil size. At operation 810, the HMD 101 adjusts lights 210 output based on the monitored pupil size.

Figure 9A:
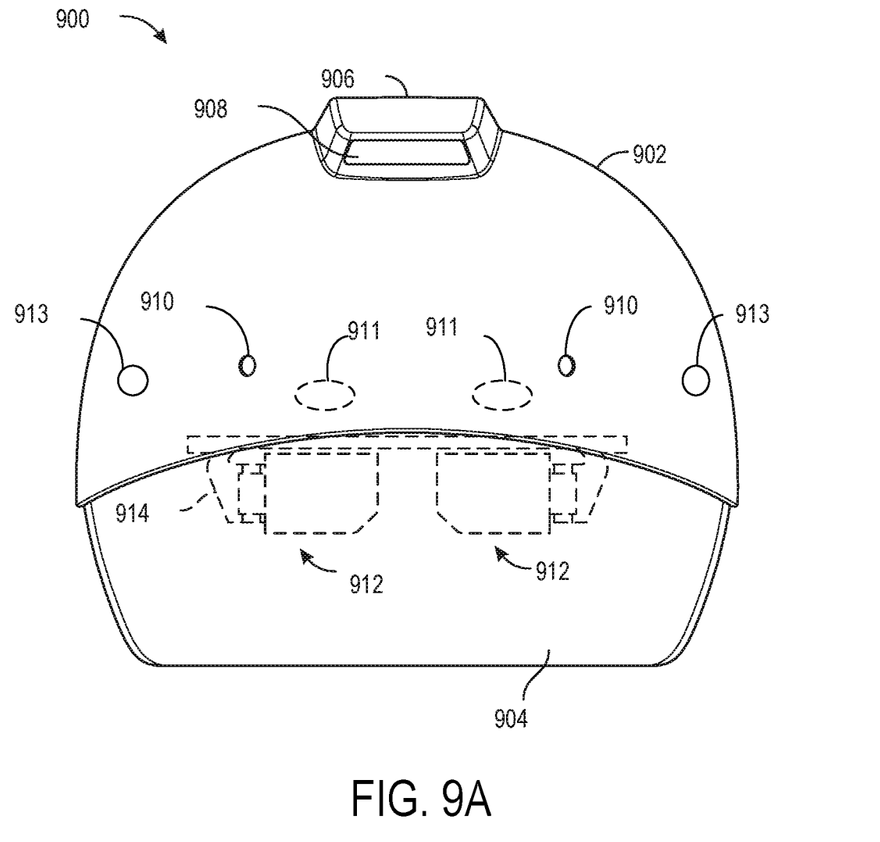
FIG. 9A is a block diagram illustrating a front view of a head mounted device, according to some example embodiments.
Figure 9B:
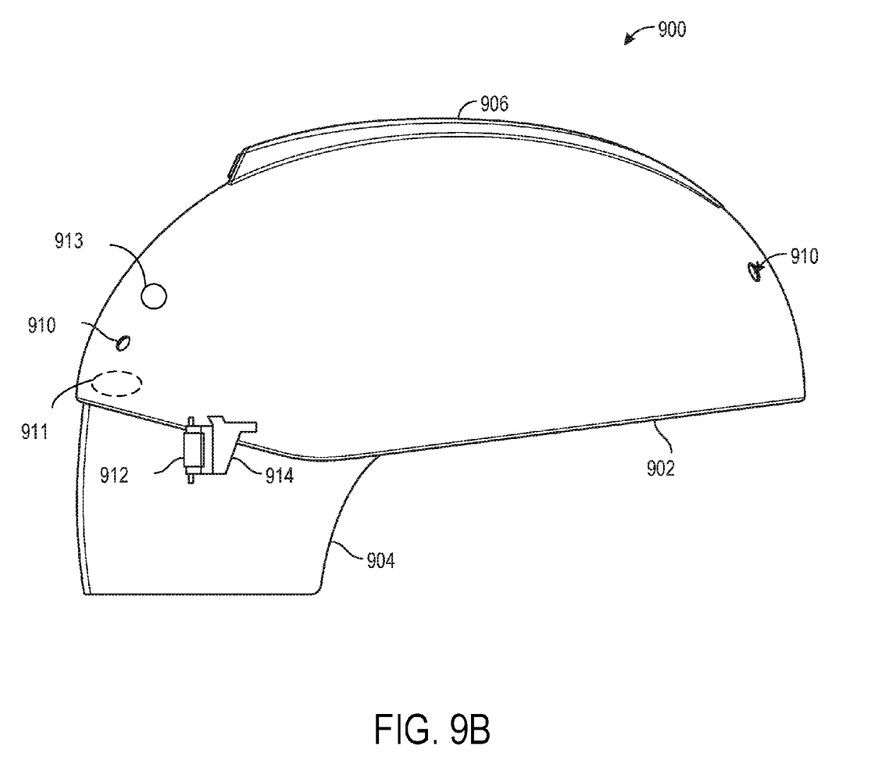
FIG. 9B is a block diagram illustrating a side view of the head mounted device of FIG. 9A.

FIG. 9A is a block diagram illustrating a front view of a head mounted device 900, according to some example embodiments. FIG. 9B is a block diagram illustrating a side view of the head mounted device 900 of FIG. 9A.

The HMD 900 includes a helmet 902 connected to a visor 904. The helmet 902 may include sensors 202 (e.g., optical and audio sensors) 908 and 910 disposed in the front, back, and a top section 906 of the helmet 902. Display lenses 912 are mounted on a lens frame 914. The display lenses 912 include display 204 of FIG. 2. The helmet 902 includes pupil dimension sensor 911 (as described by pupil dimension sensor 304) in a housing of the helmet 902. Each pupil dimension sensor 911 is directed to an eye of the user 102 to measure the pupil dimension. Each pupil dimension sensor 911 may be positioned above each eye. The helmet 902 includes LED lights 913 on each side of the helmet 902. The LED lights 913 operate based on the dimension of the pupil of the user 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system or one or more hardware modules of a computer system (e.g., a processor 212 or a group of processors 212) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 212 or other programmable processor 212) that is temporarily configured by software to perform certain operations. It will be appreciated that the decision to implement a hardware module mechanically, in dedicated and permanently configured circuitry, or in temporarily configured circuitry (e.g., configured by software may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 212 configured using software, the general-purpose processor 212 may be configured as respective different hardware modules at different times. Software may accordingly configure a processor 212, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 212 that are temporarily configured (e.g., by software) or permanently configured to perform the relevant operations. Whether temporarily or permanently configured, such processors 212 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 212 or processor-implemented modules. The performance of certain of the operations may be distributed among the one or more processors 212, not only residing within a single machine, but deployed across a number of machines. In some example embodiments, the processor or processors 212 may be located in a single location (e.g., within a home environment, an office environment or as a server farm), while in other embodiments the processors 212 may be distributed across a number of locations.

The one or more processors 212 may also operate to support performance of the relevant operations in a "cloud computing" environment or as a "software as a service" (SaaS). For example, at least some of the operations may be performed by a group of computers (as examples of machines including processors 212), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor 212, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 212 executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 212), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
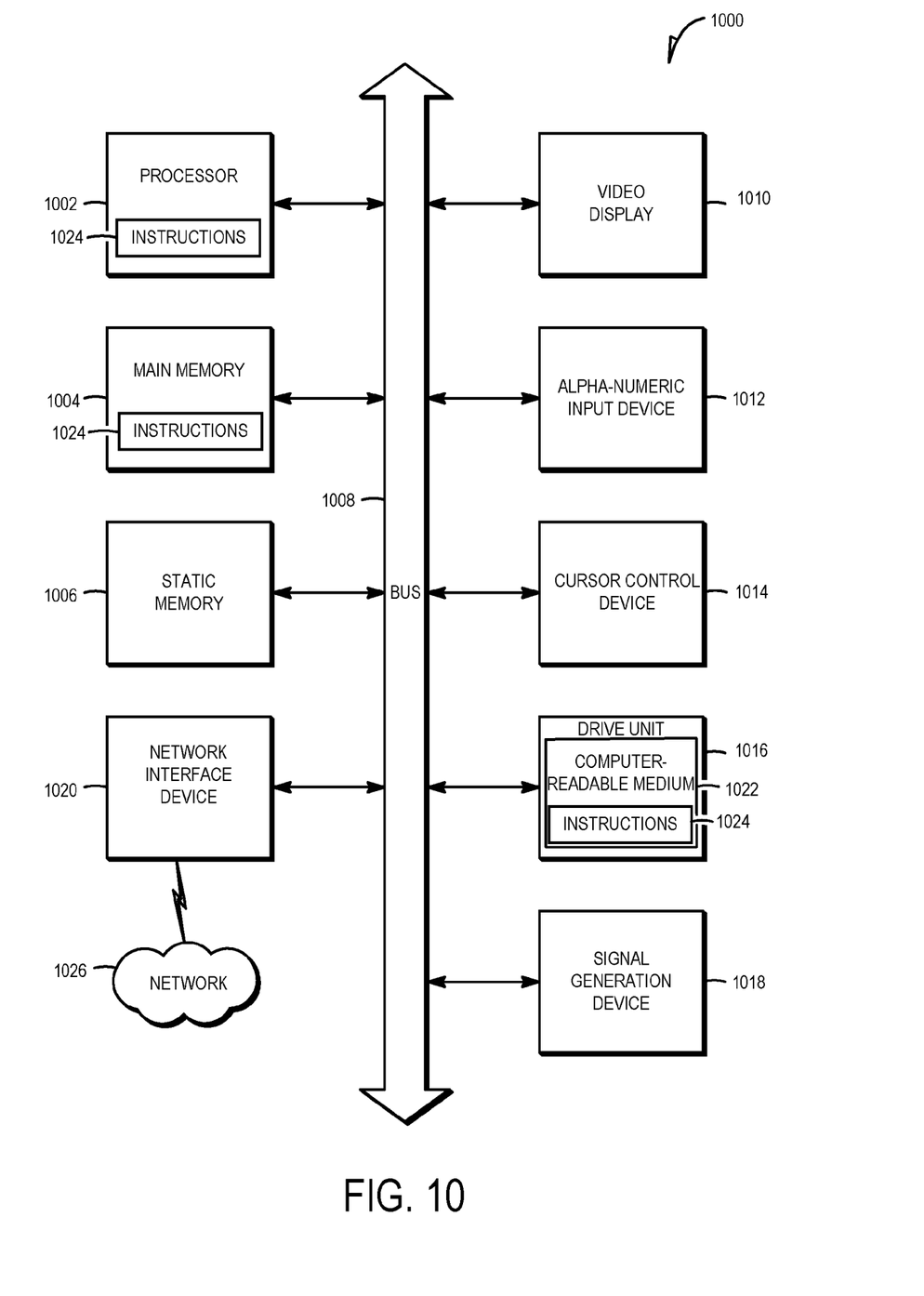
FIG. 10 is a block diagram illustrating components of a machine, according to some example embodiments, able to read instructions from a machine-readable medium and perform any one or more of the methodologies discussed herein.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media 1022. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers 110) that store the one or more instructions 1024 or data structures. The term "machine-readable medium" shall also be taken to include any tangible medium that is capable of storing, encoding or carrying instructions 1024 for execution by the machine and that cause the machine to perform any one or more of the methodologies of the present embodiments, or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks 1026 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A head mounted device comprising:
   a helmet;
   an ambient light sensor disposed in an outside surface of the helmet and configured to measure ambient light outside the helmet;
   a pupil dimension sensor disposed in a housing of the helmet and configured to measure a size of a pupil of a wearer of the helmet;
   a lighting element disposed in the outside surface of the helmet and directed away from the pupil of the wearer of the helmet, the lighting element being configured to illuminate a physical object external to the head mounted device; and
   a dynamic lighting system configured to control the lighting element and adjust an intensity of the lighting element based on the ambient light and the pupil size of the wearer of the helmet.

2. The head mounted device of claim 1, wherein the pupil dimension sensor comprises an infrared camera pointed towards an eye of the wearer of the helmet to capture an image of the pupil of the wearer, and to measure the size of the pupil based on the image of the pupil.

3. The head mounted device of claim 1, wherein the dynamic lighting system is configured to increase the intensity of the lighting element in response to the pupil size exceeding a pupil size threshold.

4. The head mounted device of claim 1, wherein the dynamic lighting system is configured to decrease the intensity of the lighting element in response to the pupil size falling below a pupil size threshold.

5. The head mounted device of claim 1, wherein the dynamic lighting system is configured to adjust the intensity of the lighting element to maintain the size of the pupil within a predefined pupil size range.

6. The head mounted device of claim 1, further comprising:
   an eye gaze sensor configured to determine a position of the pupil relative to an eye of the wearer of the helmet, wherein the dynamic lighting system is configured to adjust a position of the lighting element to direct an output of the lighting element in a direction corresponding to the position of the pupil.

7. The head mounted device of claim 1, further comprising:
   a camera embedded in the outside surface of the helmet;
   a hardware processor of a machine comprising an augmented reality application configured to generate augmented reality content based on images captured with the camera; and
   a transparent display lens mounted to a frame connected to the housing of the helmet, the transparent display lens configured to display the augmented reality content.

8. The head mounted device of claim 7, wherein the pupil dimension sensor is embedded in the transparent display lens.

9. The head mounted device of claim 7, wherein the dynamic lighting system is further configured to adjust a brightness of the augmented reality content in the transparent display lens in conjunction with the intensity of the lighting element based on the pupil size of the wearer of the helmet.

10. The head mounted device of claim 7, wherein the augmented reality application is configured to identify an object in an image captured with the camera, to retrieve a three-dimensional model of a virtual object from the augmented reality content based on the identified object, to render the three-dimensional model of the virtual object in the transparent display lens, the virtual object perceived as an overlay on the object.

11. A method comprising:
measuring ambient light outside a head mounted device comprising a helmet, an ambient light sensor disposed in an outside surface of the helmet;
measuring a size of a pupil of a wearer of the helmet with a pupil dimension sensor disposed in a housing of the helmet; and
adjusting an intensity of a lighting element based on the ambient light and the pupil size of the wearer of the helmet, the lighting element being disposed in the outside surface of the helmet and being directed away from the pupil of the wearer of the helmet, the lighting element being configured to illuminate a physical object external to the head mounted device.

12. The method of claim 11, further comprising:
measuring the size of the pupil of the wearer with an infrared camera pointed towards an eye of the wearer of the helmet to capture an image of the pupil of the wearer.

13. The method of claim 11, further comprising:
increasing the intensity of the lighting element in response to the pupil size exceeding a pupil size threshold.

14. The method of claim 11, further comprising:
decreasing the intensity of the lighting element in response to the pupil size falling below a pupil size threshold.

15. The method of claim 11, further comprising:
adjusting the intensity of the lighting element to maintain the size of the pupil within a predefined pupil size range.

16. The method of claim 11, further comprising:
determining a position of the pupil relative to the eye of the wearer of the helmet; and
adjusting a position of the lighting element to direct an output of the lighting element in a direction corresponding to the position of the pupil.

17. The method of claim 11, further comprising:
generating augmented reality content based on images captured with a camera in the helmet; and
displaying augmented reality content in a transparent display lens of the helmet.

18. The method of claim 17, further comprising:
adjusting a brightness of the augmented reality content in the transparent display lens in conjunction with the intensity of the lighting element based on the pupil size of the wearer of the helmet.

19. The method of claim 17, further comprising:
identifying an object in an image captured with the camera;
retrieving a three-dimensional model of a virtual object from the augmented reality content based on the identified object; and
rendering the three-dimensional model of the virtual object in the transparent display lens, the virtual object perceived as an overlay on the object.

20. A non-transitory machine-readable medium comprising instructions that, when executed by one or more processors of a machine, cause the machine to perform operations comprising:
measuring ambient light outside a head mounted device comprising a helmet, an ambient light sensor disposed in an outside surface of the helmet;
measuring a size of a pupil of a wearer of the helmet with a pupil dimension sensor disposed in a housing of the helmet; and
adjusting an intensity of a lighting element based on the ambient light and the pupil size of the wearer of the helmet, the lighting element being disposed in the outside surface of the helmet and being directed away from the pupil of the wearer of the helmet, the lighting element being configured to illuminate a physical object external to the head mounted device.

* * * * *